(12) United States Patent
Boyd et al.

(10) Patent No.: US 8,096,667 B2
(45) Date of Patent: Jan. 17, 2012

(54) LIGHT CONTROL FILM WITH OFF-AXIS VISIBLE INDICIA

(75) Inventors: Gary T. Boyd, Woodbury, MN (US); Dale L. Ehnes, Cotati, CA (US); Tri D. Pham, Oakdale, MN (US)

(73) Assignee: 3M Innovative Properties Company, St. Paul, MN (US)

( * ) Notice: Subject to any disclaimer, the term of this patent is extended or adjusted under 35 U.S.C. 154(b) by 358 days.

(21) Appl. No.: 12/465,481

(22) Filed: May 13, 2009

(65) Prior Publication Data

US 2009/0284836 A1 Nov. 19, 2009

Related U.S. Application Data

(60) Provisional application No. 61/053,813, filed on May 16, 2008.

(51) Int. Cl.
*G02B 27/00* (2006.01)
(52) U.S. Cl. ........................................ 359/614; 359/601
(58) Field of Classification Search .......... 359/601–614, 359/450–460
See application file for complete search history.

(56) References Cited

U.S. PATENT DOCUMENTS

| | | | |
|---|---|---|---|
| 4,576,850 A | 3/1986 | Martens | |
| 5,486,949 A | 1/1996 | Schrenk et al. | |
| 5,612,820 A | 3/1997 | Schrenk et al. | |
| 5,736,233 A | 4/1998 | Fye | |
| 5,783,120 A | 7/1998 | Ouderkirk et al. | |
| 5,825,543 A | 10/1998 | Ouderkirk et al. | |
| 5,828,488 A | 10/1998 | Ouderkirk et al. | |
| 5,882,774 A | 3/1999 | Jonza et al. | |
| 6,111,696 A | 8/2000 | Allen et al. | |
| 6,239,911 B1 * | 5/2001 | Koike et al. | 359/601 |
| 6,398,370 B1 | 6/2002 | Chiu et al. | |
| 7,041,436 B2 | 5/2006 | Krause et al. | |
| 7,210,806 B2 | 5/2007 | Holman et al. | |
| 7,246,824 B2 | 7/2007 | Hudson | |
| 7,467,873 B2 * | 12/2008 | Clarke et al. | 359/601 |
| 2007/0160811 A1 | 7/2007 | Gaides et al. | |

FOREIGN PATENT DOCUMENTS

| | | |
|---|---|---|
| EP | 0354672 | 2/1990 |
| WO | WO 2006/006056 | 1/2006 |
| WO | WO 2007/084297 | 7/2007 |

* cited by examiner

*Primary Examiner* — Thong Nguyen
(74) *Attorney, Agent, or Firm* — Kristofor L. Storvick

(57) ABSTRACT

In one aspect, the invention provides a light control film having an indicium visible at a range of viewing angles. The light control film comprises a light input surface and a light output surface opposite the light input surface. The control film further comprises alternating transmissive and absorptive regions disposed between the light input surface and the light output surface. Each absorptive region has a height and a length, wherein the heights of the absorptive regions corresponding to the indicium are different that the heights of the absorptive regions that surround the absorptive regions corresponding to indicium.

14 Claims, 6 Drawing Sheets

LIGHT CONTROL FILM WITH OFF-AXIS VISIBLE INDICIA

CROSS REFERENCE TO RELATED APPLICATION

This application claims the benefit of U.S. Provisional Patent Application No. 61/053,813, filed May 16, 2008, the disclosure of which is incorporated by reference herein in its entirety.

BACKGROUND

The present invention pertains to light control films that allow higher transmission over one range of viewing angles and lower transmission over another range of viewing angles and having an indicia that is visible only over a range of viewing angles.

Light control film (LCF), also known as light collimating film, is an optical film that is configured to regulate the transmission of light. Various LCFs are known, and typically include a light transmissive film having a plurality of parallel grooves wherein the grooves are formed of a light-absorbing material.

LCFs can be placed proximate a display surface, image surface, or other surface to be viewed. At normal incidence, (i.e. 0 degree viewing angle) where a viewer is looking at an image through the LCF in a direction that is perpendicular to the film surface, the image is viewable. As the viewing angle increases, the amount of light transmitted through the LCF decreases until a viewing cutoff angle is reached where substantially all the light is blocked by the light-absorbing material and the image is no longer viewable. This can provide privacy to a viewer by blocking observation by others that are outside a typical range of viewing angles.

LCFs can be prepared by molding and ultraviolet curing a polymerizable resin on a polycarbonate substrate. Such LCFs are commercially available from 3M Company, St. Paul, Minn., under the trade designation "3M™ Filters for Notebook Computers and LCD Monitors".

SUMMARY

In one aspect, the invention provides a light control film having an indicium visible at a range of viewing angles. The light control film comprises a light input surface and a light output surface opposite the light input surface. The control film further comprises alternating transmissive and absorptive regions disposed between the light input surface and the light output surface. Each absorptive region has a height and a length, wherein the heights of the absorptive regions corresponding to the indicium are different that the heights of the absorptive regions that surround the absorptive regions corresponding to indicium.

In one embodiment, the heights of the absorptive regions corresponding to the indicium are less than the heights of the absorptive regions that surround the absorptive regions corresponding to the indicium.

In another embodiment, the heights of the absorptive regions corresponding to the indicium are greater than the heights of the absorptive regions that surround the absorptive regions corresponding to the indicium.

In another embodiment, the heights of some of the absorptive regions corresponding to the indicium are greater than the heights of the absorptive regions that surround the absorptive regions corresponding to the indicium and the heights of some of the absorptive regions corresponding to the indicium are less than the heights of the absorptive regions that surround the absorptive regions corresponding to the indicium.

In another embodiment, the heights of the absorptive regions corresponding to the indicium vary along the length of such absorptive regions.

In another embodiment, some of the absorptive regions corresponding to the indicium vary along the length of such absorptive regions and some of the absorptive regions corresponding to the indicium have heights greater than, less than, or both greater than and less than, the heights of the absorptive regions that surround the absorptive regions corresponding to the indicium.

DETAILED DESCRIPTION

The present application is directed to light control films having a logo or indicium that is visible during off-axis viewing and substantially invisible during on-axis viewing. The indium or indicia may appear "lighter" or "darker" depending upon the height differences of the absorptive regions. For example, the indicium will appear "darker" when the absorptive regions corresponding to the indicium have a height that is greater than the height of the absorptive regions surrounding the indicium. The indicium will appear "lighter" when the absorptive regions corresponding to the indicium are shorter than the surrounding absorptive regions. When the absorptive regions corresponding to the indicium have heights both higher and lower than the surrounding absorptive regions, the indicium will appear "grayscale."

LCFs of the invention can be placed proximate a display surface, image surface, window, document, or other surface to be viewed.

Figure 1:
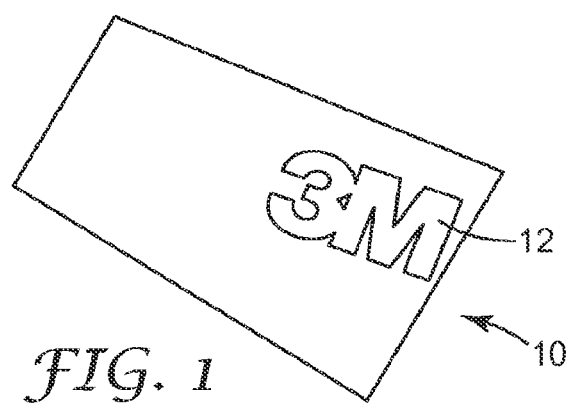
FIG. 1 is a partial plan view of a depiction of an embodiment of a light control film of the invention.

FIG. 1 is a partial perspective view of a light control film (LCF) 10 having indicia 12 that is visible off-axis.

Figure 2:
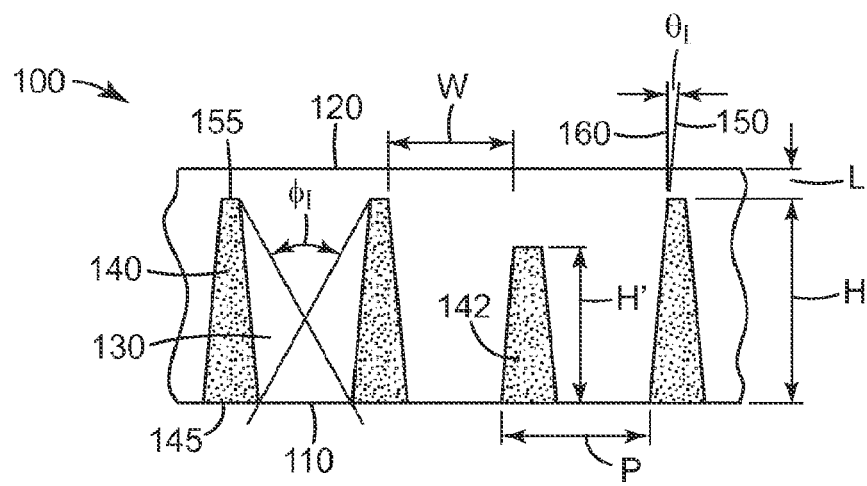
FIG. 2 is a cross sectional view of a depiction of an embodiment of a light control film of the invention.

FIG. 2 shows a cross-sectional view of an LCF 100 that includes a light output surface 120 and a light input surface 110 opposite light output surface 120. While described herein as light input surface and light output surface for reference purposes, it will be recognized that in use, the LCFs described herein may have either a light output surface facing a viewer or a display source and the light input surface may either be facing a display source or a viewer. LCF 100 includes alternating transmissive regions 130, absorptive regions 140, and an interface 150 between transmissive regions 130 and absorptive regions 140. Transmissive regions 130 have a base width "W" disposed apart from each other by a pitch "P", and include a land region "L" between absorptive regions 140 and light output surface 120. Absorptive regions 140 have a base 145, a top surface 155, heights "H" and "H'" and are displaced apart from each other by pitch "P". Interface 150 forms an interface angle $\theta_I$ with a normal 160 to light output surface 120. As described herein, by "normal" to a surface is meant perpendicular to the major plane of the surface, discounting any local variation is surface smoothness. LCF 100 includes an internal viewing cutoff angle $\Phi_I$ defined by the geometry of alternating transmissive regions 130 and absorptive regions 140. In this embodiment, absorptive region 142 corresponds to a portion of an indicium and has a height "H'" that is less than height "H". The height H' can be zero height.

Figure 3:
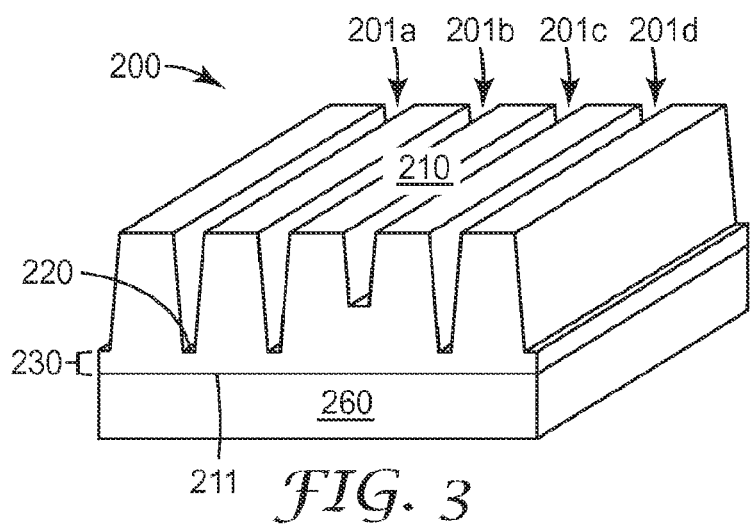
FIG. 3 is a perspective view of a depiction of a microstructured film article.

FIG. 3 shows a microstructured film article 200 comprising at least one microstructured surface 210, which can be used to make an LCF. In one embodiment, microstructured surface 210 can include a plurality of grooves 201a-201d. In this embodiment, groove 201c has less depth than grooves 201a, 201b and 201d.

As shown in FIG. 3, a continuous land layer 230 can be present between the base of the grooves 220 and the opposing surface 211 of microstructured film article 200. The base of the grooves 220 may alternatively extend all the way through the microstructured film article 200 (not shown). Microstructured film article 200 may also include a base substrate layer 260, which can be integrally formed with, or separately added to microstructured film article 200 (whether by extrusion, cast-and-cure, or some other method).

Figure 4:
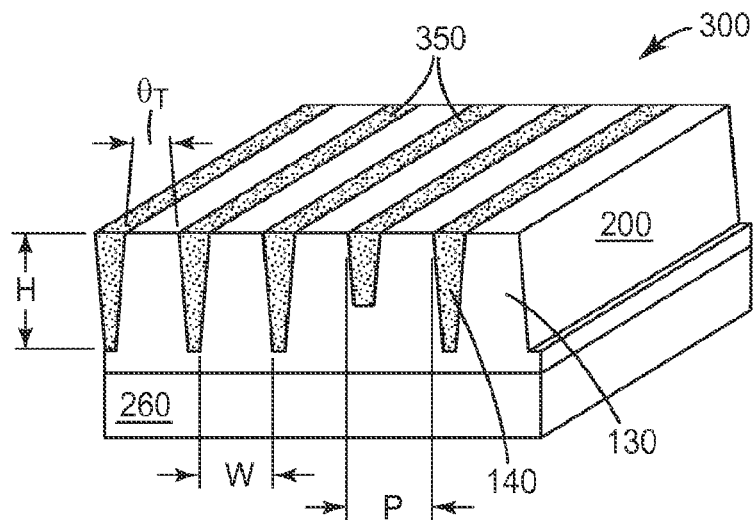
FIG. 4 is a perspective view of a depiction of an embodiment of a light control film of the invention.

FIG. 4 shows an LCF 300 wherein grooves 201a-201d of FIG. 2 have been rendered light-absorbing by filling them with light absorbing material 350. Light absorbing material 350 in the shape of grooves 201a-201d of microstructured film 200 is hereinafter referred to as absorptive region 140. In this embodiment, the absorptive regions have lengths that correspond to the lengths of the transmissive regions.

Figure 5:
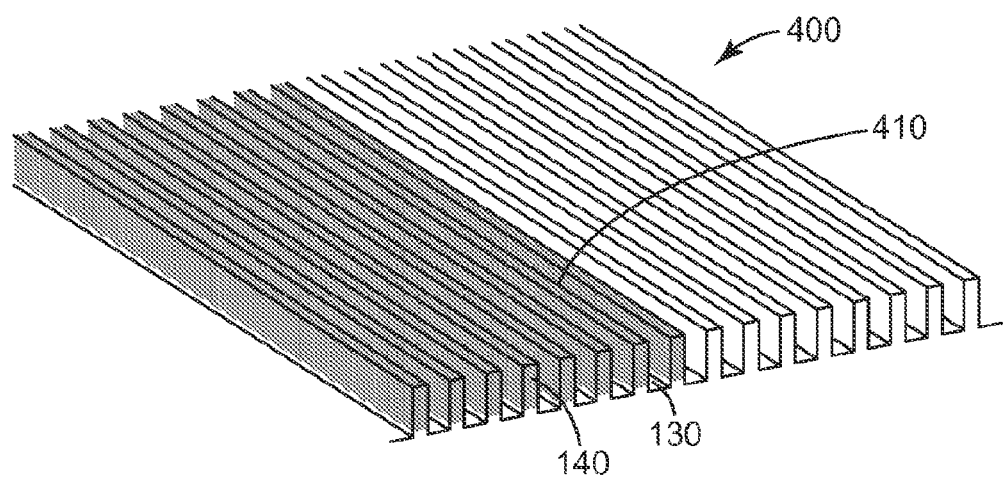
FIG. 5 is a partial plan view of a depiction of an embodiment of a light control film of the invention.

FIG. 5 shows an LCF 400 having absorptive regions 140, transmissive regions 130, and a partial indicium 410. In this embodiment, the heights of the absorptive regions corresponding to the indicium are less than the heights of the absorptive regions that surround the indicium.

Figure 6:
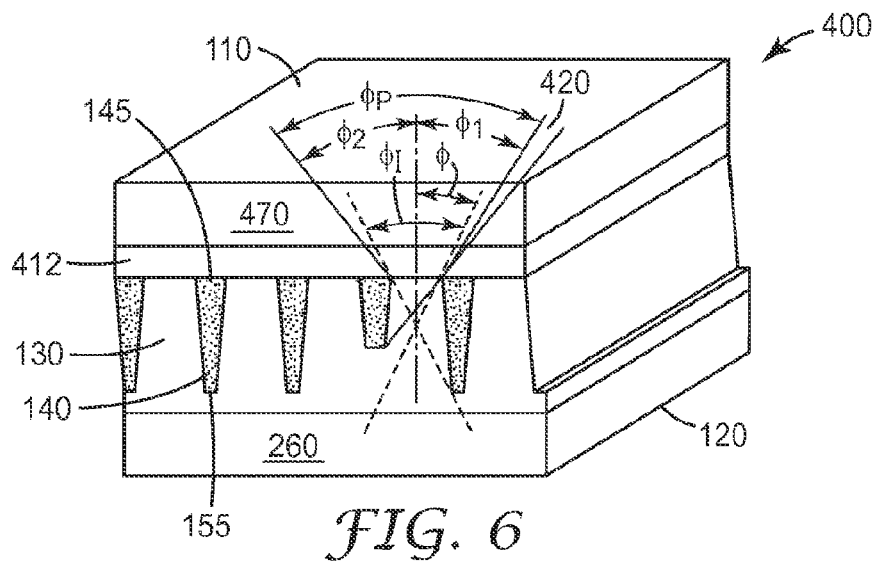
FIG. 6 is a partial perspective view of a depiction of an embodiment of a light control film of the invention.

FIG. 6 shows LCF 400 that further includes an optional cover film 470 that can be the same material as, or different than, base substrate layer 260. Materials for optical cover film 470 or base substrate layer 260 may include, for instance, commercially available polycarbonate films. The particular polycarbonate material may be selected so as to provide a matte finish or a glossy finish. Optical cover film 470 and base substrate layer 260 may either or both be matte or glossy. Any of the four combinations are contemplated herein. Optional cover film 470 can be bonded to the microstructured surface with an adhesive 412. Adhesive 412 can be any optically clear adhesive, such as a UV-curable acrylate adhesive, a transfer adhesive, and the like. LCF 400 also includes light input surface 110 and light output surface 120 opposite light input surface 110, together defining a major plane. Again, it is to be understood that for the purposes of describing the embodiments presented herein, LCF 400 is positioned such that light input surface 110 is disposed proximate to a base 145 of absorptive region 140, however, light input surface 110 can also be disposed opposite base 145, proximate to top surface 155. In other words, LCF 400 can be positioned such that base 145 is close to a light source (not shown) that injects light into light input surface 110, or it can also be positioned such that top surface 155 is closer to a light source (not shown).

Figure 7:
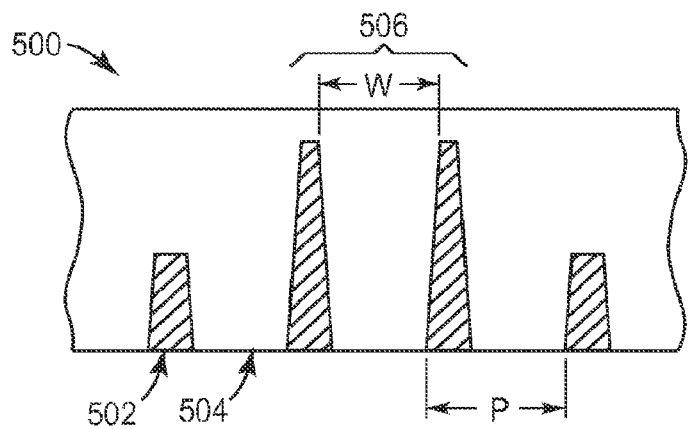
FIG. 7 is a cross sectional view of a depiction of an embodiment of a light control film of the invention.

FIG. 7 shows a cross sectional view of another embodiment of an LCF 500 having absorptive regions 502 and transmissive regions 504. In this embodiment, the heights of the absorptive regions that correspond to an indicium 506 are greater than the heights of the absorptive regions that surround the indicium.

Figure 8:
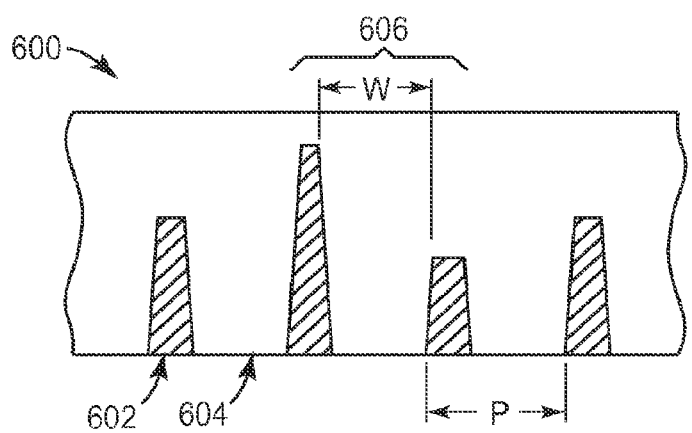
FIG. 8 is a cross sectional view of a depiction of an embodiment of a light control film of the invention.

FIG. 8 shows a cross sectional view of another embodiment of an LCF 600 having absorptive regions 602 and transmissive regions 604. In this embodiment, the heights of the absorptive regions that correspond to an indicium 606 are both greater and less than the heights of the absorptive regions that surround the indicium.

Figure 9:
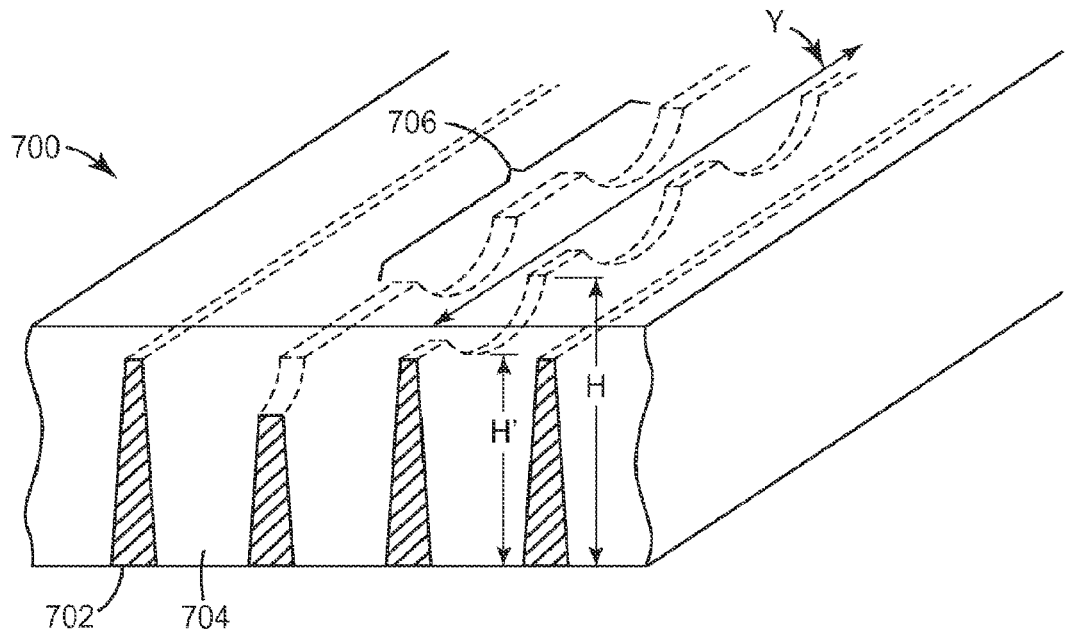
FIG. 9 is a partial perspective view of a depiction of an embodiment of a light control film of the invention.

FIG. 9 shows a partial perspective view of another embodiment of an LCF 700 having absorptive regions 702 and transmissive regions 704. In this embodiment, the heights H, H' of the absorptive regions corresponding to an indicium 706 vary along the length Y of such absorptive regions. This embodiment illustrates that localized height variations of absorptive regions that correspond to indicia are within the scope of the invention.

Figure 10:
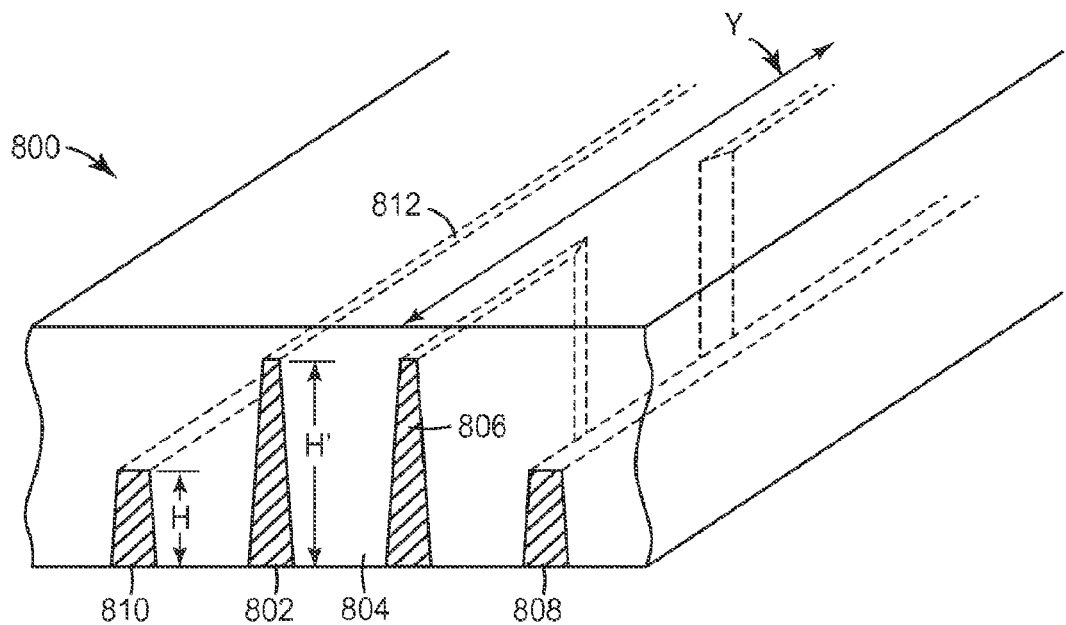
FIG. 10 is a partial perspective view of a depiction of an embodiment of a light control film of the invention.

FIG. 10 shows a partial perspective view of another embodiment of an LCF 800 having absorptive regions 802 and transmissive regions 804. In this embodiment, the heights H' of the absorptive regions that correspond to a first indicium 812 are greater than the heights H of absorptive regions 808 and 810 that surround the indicium. In this embodiment, absorptive region 806 corresponding to a second indicium has a variable height along a portion of length Y. The heights of absorptive region 812 in this embodiment does not vary along length Y of the absorptive region. Of course, any of the embodiments of LCFs described in this application can have at least first and second indicium. Thus, the absorptive regions corresponding to different indicium can have the same or different heights (as compared to one another) depending upon the desired viewing characteristics of the indicium.

Figure 11:
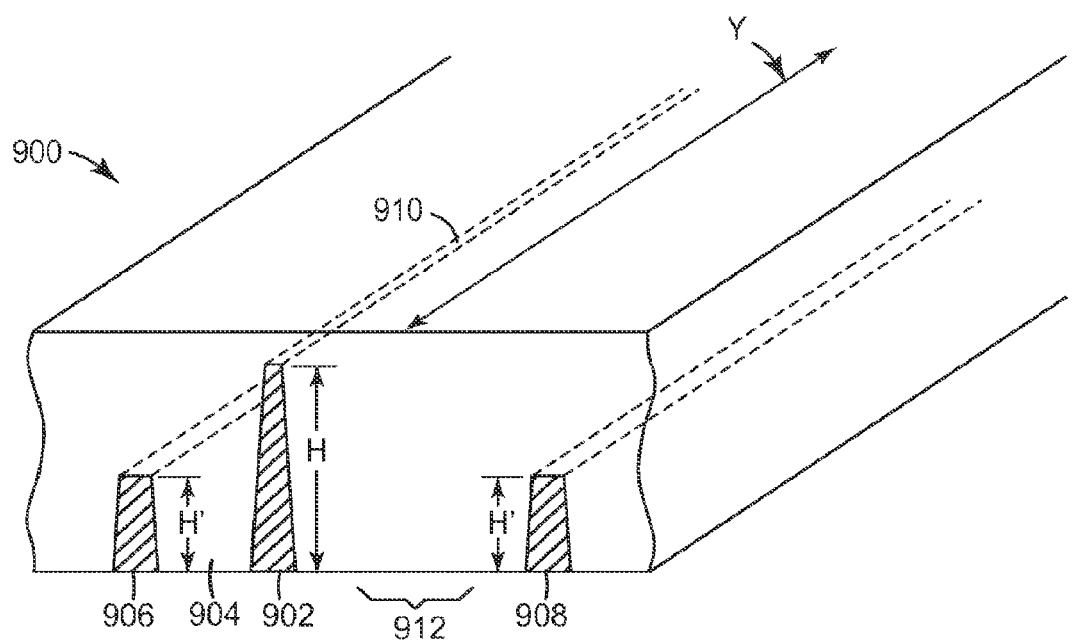
FIG. 11 is a partial perspective view of a depiction of an embodiment of a light control film of the invention.

FIG. 11 shows a partial perspective view of another embodiment of an LCF 900 having absorptive regions 902 and transmissive regions 904. In this embodiment, absorptive regions 906 and 908 corresponding to a first indicium have heights H' less than the height H of absorptive region 910. Additionally, transmissive region 912 is defined by the absence of an absorptive region. In this case, the "absorptive region" corresponding to a second indicium has zero height.

As shown in FIGS. 4 and 6 (and more particularly labeled in FIG. 2), transmissive regions 130 between absorptive regions 140 have an included wall angle $\theta_T$, a transmissive region base width "W", an effective height "H", a pitch "P" (each shown in FIG. 3), and a polar viewing cutoff angle $\Phi_P$ (shown in FIG. 4). Included wall angle $\theta_T$ is two times the interface angle $\theta_I$ shown in FIG. 2 for symmetric absorptive regions. In one case, interface angle $\theta_I$ can be different for each interface 150, and included wall angle $\theta_T$ is equal to the sum of the interface angles $\theta_I$ on each side of absorptive region 140, for an unsymmetrical absorptive region. Polar viewing cutoff angle $\Phi_P$ can be determined by applying Snell's law to the rays defining the internal viewing cutoff angle $\Phi_I$, using the indices of refraction of optional cover film 470, adhesive 410, transmissive regions 130, base substrate layer 260, and the material that LCF 400 is immersed in (typically air). Polar viewing cutoff angle $\Phi_P$ is equal to the sum of a polar viewing cutoff half angle $\Phi_1$ and a polar viewing cutoff half angle $\Phi_2$ each of which are measured from the normal to light input surface 110. In some cases, polar viewing cutoff angle $\Phi_P$ can be symmetric, and polar viewing cutoff half angle $\Phi_1$ is equal to polar viewing cutoff half angle $\Phi_2$. In some cases, polar viewing cutoff angle $\Phi_P$ can be asymmetric, and polar viewing cutoff half angle $\Phi_1$ is not equal to polar viewing cutoff half angle $\Phi_2$. For the purposes of this disclosure, an angle "$\Phi$" shown in FIG. 6 and measured from the normal to light input surface 110 along the direction shown, is herein referred to as a "polar viewing angle". The polar viewing angle $\Phi$ can range from 0° (i.e. normal to light input surface 110) to 90° (i.e. parallel to light input surface 110). The angle represented by 420 is the angle range in which the indicium is visible.

The material properties of transmissive regions 130, included wall angle $\theta_T$, pitch "P", and transmissive region base width "W" can impact light transmission through LCF 400. LCFs can have relatively large included wall angles, such as greater than 10 degrees or more. Larger wall angles increase the width of the light absorbing regions, thereby decreasing transmission at normal incidence. Smaller wall angles are preferred, such as less than 10 degrees, so that the transmission of light at normal incidence can be made as large as possible.

In some embodiments, LCFs described herein have an included wall angle of not greater than 6°. In other embodiments, the included wall angle is not greater than 5°, such as up to 5°, 4°, 3°, 2°, 1° or 0.1°. As described herein, the included wall angle can be related to the interface angle for symmetric and asymmetric absorptive regions. As such, in one aspect, the interface angle can be 3°, or not greater than 3°, for example not greater than 2.5°, 2°, 1°, or 0.1°. Smaller wall angles can form grooves having a relatively high aspect ratio (H/W) at a smaller pitch "P", and can provide a sharper image cutoff at lower viewing angles. In some cases, the transmissive regions have an average height, "H", and an average width at its widest portion, "W", and H/W is at least 1.75. In some cases, H/W is at least 2.0, 2.5, 3.0 or greater.

LCFs can be made to have any desired polar viewing cutoff angle. In one aspect, the polar viewing cutoff angle ranges from 40° to 90° or even higher. The polar viewing cutoff angle $\Phi_P$, can be determined as discussed elsewhere by the parameters "$\theta_T$", "H", "W", "P", and the indices of the LCF materials.

In some cases, it can also be useful to define an "effective polar viewing angle" which includes light transmitted through the LCF at angles larger than the polar viewing cutoff angle. For example, light that intercepts the absorptive regions at angles slightly larger than the internal viewing cutoff angle $\Phi_1$ can "bleed through" the thinnest portions of the absorptive region (i.e. partially transmit through the top and bottom of the light absorbing regions represented as trapezoids shown in FIG. 1). Further, light traveling normal to the plane of the LCF may scatter and stray outside the effective polar viewing angle. The effective polar viewing angle as used herein is defined as the angle at which the relative brightness ratio decreases to 5% or less. The relative brightness ratio is the ratio (expressed as a percentage) of the brightness of a diffuse light source as measured through an LCF to the brightness of the same diffuse light source as measured without the LCF. The specifics of the relative brightness ratio measurement are further described in the Examples below.

Also used in the art is the term "functional polar viewing angle" which also includes light transmitted through the LCF at angles larger than the polar viewing cutoff. The functional polar viewing angle is defined as the angle at which the brightness of the display with LCF decreases to a small percentage of the axial brightness of the display with LCF, for example 10%, 5% or even less. Such a view angle definition, however, may be display dependent.

Light absorbing materials for the light absorbing regions in LCFs can be any suitable material that functions to absorb or block light at least in a portion of the visible spectrum. In some embodiments, the light absorbing material can be coated or otherwise provided in grooves or indentations in a light transmissive film to form light absorbing regions. In further embodiments, light absorbing materials can include a black colorant, such as carbon black. The carbon black may be a particulate carbon black having a particle size less than 10 microns, for example 1 micron or less. The carbon black may, in some embodiments, have a mean particle size of less than 1 micron. In another embodiment, the light absorbing materials can include a colorant having other colors such as white, red, green, or yellow. In yet further embodiments, the absorbing material, (e.g., carbon black, another pigment or dye, or combinations thereof) can be dispersed in a suitable binder. Light absorbing materials also include particles or other scattering elements that can function to block light from being transmitted through the light absorbing regions.

Reflections at the light transmissive region/light absorbing region interface can be controlled by mismatching the relative index of refraction of the light transmissive material and the index of refraction of the light absorbing material over at least a portion of the spectrum, for example the human visible spectrum. In some cases, the index of refraction of the cured transmissive regions (N1) is greater than the index of refraction of the cured light absorptive regions (N2) by less than about 0.005. In such cases, the index of refraction difference, (N2−N1) is not less than −0.005, or, (N2−N1) is greater than or equal to −0.005.

The LCFs described herein include a plurality of light absorbing regions. In some embodiments, the light absorbing regions can be a plurality of channels, as shown elsewhere in the description. In some cases, the LCF can include a plurality of columns such as shown in FIG. 2b of U.S. Pat. No. 6,398,370 (Chiu et al.). In some cases, the LCF described herein can be combined with a second LCF, as also described in U.S. Pat. No. 6,398,370. In other embodiments, the light absorbing regions are columns, posts, pyramids, cones and other structures that can add angular-dependent light transmitting or light blocking capabilities to a film.

The polymerizable resin can comprise a combination of a first and second polymerizable component selected from (meth)acrylate monomers, (meth)acrylate oligomers, and mixtures thereof. As used herein, "monomer" or "oligomer" is any substance that can be converted into a polymer. The term "(meth)acrylate" refers to both acrylate and methacrylate compounds. In some cases, the polymerizable composition can comprise a (meth)acrylated urethane oligomer, (meth)acrylated epoxy oligomer, (meth)acrylated polyester oligomer, a (meth)acrylated phenolic oligomer, a (meth)acrylated acrylic oligomer, and mixtures thereof. The polymerizable resin can be a radiation curable polymeric resin, such as a UV curable resin. In some cases, polymerizable resin compositions useful for the LCF of the present description can include polymerizable resin compositions such as are described in U.S. Publication No. 2007/0160811 (Gaides et al.), to the extent that those compositions satisfy the index and absorption characteristics herein described.

A microstructure-bearing article (e.g. microstructured film article 200 shown in FIG. 3) can be prepared by a method including the steps of (a) preparing a polymerizable composition; (b) depositing the polymerizable composition onto a master negative microstructured molding surface in an amount barely sufficient to fill the cavities of the master; (c)

filling the cavities by moving a bead of the polymerizable composition between a preformed base and the master, at least one of which is flexible; and (d) curing the composition. The deposition temperature can range from ambient temperature to about 180° F. (82° C.). The master can be metallic, such as nickel, chrome- or nickel-plated copper or brass, or can be a thermoplastic material that is stable under the polymerization conditions, and has a surface energy that allows clean removal of the polymerized material from the master. One or more of the surfaces of the base film can optionally be primed or otherwise be treated to promote adhesion of the optical layer to the base.

The polymerizable resin compositions described herein are suitable for use in the manufacture of other light transmissive and/or microstructured articles including for example brightness enhancing films and the like. The term "microstructure" is used herein as defined and explained in U.S. Pat. No. 4,576,850 (Martens). Microstructures are generally discontinuities such as projections and indentations in the surface of an article that deviate in profile from an average center line drawn through the microstructure such that the sum of the areas embraced by the surface profile above the center line is equal to the sum of the areas below the line, the line being essentially parallel to the nominal surface (bearing the microstructure) of the article. The heights of the deviations will typically be about +/−0.005 to +/−750 microns, as measured by an optical or electron microscope, through a representative characteristic length of the surface, e.g., 1-30 cm. The average center line can be plano, concave, convex, aspheric or combinations thereof. Articles where the deviations are of low order, e.g., from +/−0.005, +/−0.1 or, +/−0.05 microns, and the deviations are of infrequent or minimal occurrence, i.e., the surface is free of any significant discontinuities, can be considered to have an essentially "flat" or "smooth" surface. Other articles have deviations are of high-order, e.g., from +/−0.1 to +/−750 microns, and attributable to microstructure comprising a plurality of utilitarian discontinuities which are the same or different and spaced apart or contiguous in a random or ordered manner.

The chemical composition and thickness of the base material can depend on the requirements of the product that is being constructed. That is, balancing the needs for strength, clarity, optical retardance, temperature resistance, surface energy, adherence to the optical layer, among others. In some cases, the thickness of the base layer can be at least about 0.025 millimeters (mm) and can be from about 0.1 mm to about 0.5 mm.

Useful base materials include, for example, styrene-acrylonitrile, cellulose acetate butyrate, cellulose acetate propionate, cellulose triacetate, polyether sulfone, polymethyl methacrylate, polyurethane, polyester, polycarbonate, polyvinyl chloride, polystyrene, polyethylene naphthalate, copolymers or blends based on naphthalene dicarboxylic acids, polyolefin-based material such as cast or orientated films of polyethylene, polypropylene, and polycyclo-olefins, polyimides, and glass. Optionally, the base material can contain mixtures or combinations of these materials. In one case, the base may be multi-layered or may contain a dispersed component suspended or dispersed in a continuous phase.

In one aspect, examples of base materials include polyethylene terephthalate (PET) and polycarbonate (PC). Examples of useful PET films include photograde polyethylene terephthalate, available from DuPont Films of Wilmington, Del. under the trade designation "Melinex 618". Examples of optical grade polycarbonate films include LEXAN® polycarbonate film 8010, available from GE Polymershapes, Seattle Wash., and Panlite 1151, available from Teijin Kasei, Alpharetta Ga.

Some base materials can be optically active, and can act as polarizing materials. A number of bases, also referred to herein as films or substrates, are known in the optical product art to be useful as polarizing materials. Polarization of light through a film can be accomplished, for example, by the inclusion of dichroic polarizers in a film material that selectively absorbs passing light. Light polarization can also be achieved by including inorganic materials such as aligned mica chips or by a discontinuous phase dispersed within a continuous film, such as droplets of light modulating liquid crystals dispersed within a continuous film. As an alternative, a film can be prepared from microfine layers of different materials. The polarizing materials within the film can be aligned into a polarizing orientation, for example, by employing methods such as stretching the film, applying electric or magnetic fields, and coating techniques.

Examples of polarizing films include those described in U.S. Pat. Nos. 5,825,543 (Ouderkirk et al.); 5,783,120 (Ouderkirk et al.); 5,882,774 (Jonza et al.); 5,612,820 (Shrenk et al.) and 5,486,949 (Shrenk et al.). The use of these polarizer films in combination with prismatic brightness enhancement film has been described, for example, in U.S. Pat. Nos. 6,111,696 (Allen et al.) and 5,828,488 (Ouderkirk et al.). Films available commercially are multilayer reflective polarizer films such as Vikuiti™ Dual Brightness Enhancement Film "DBEF", available from 3M Company.

The base materials listed herein are not exclusive, and as will be appreciated by those of skill in the art, other polarizing and non-polarizing films can also be useful as the base for the optical products of the description. These base materials can be combined with any number of other films including, for example, polarizing films to form multilayer structures. The thickness of a particular base can also depend on the desired properties of the optical product.

Figure 12:
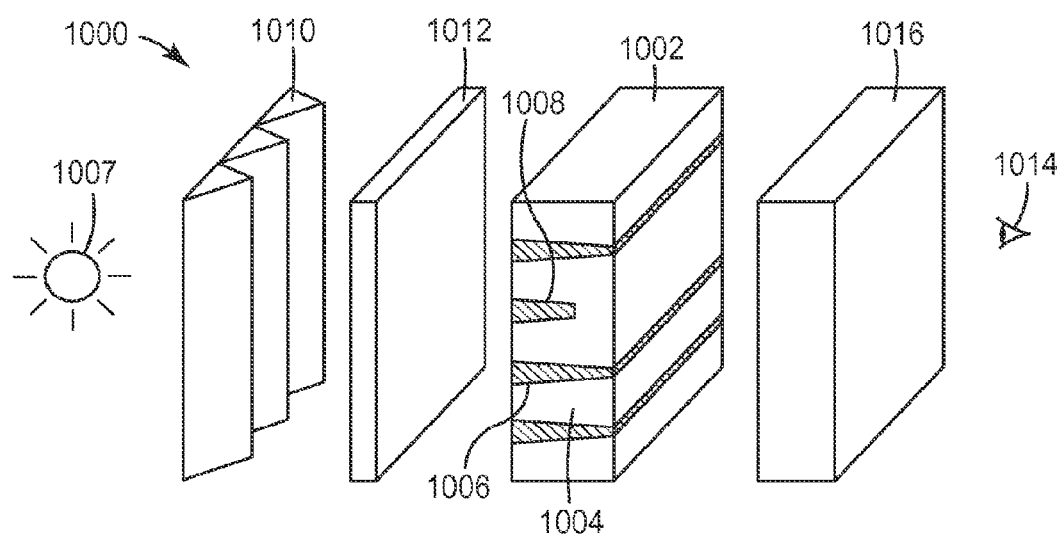
FIG. 12 is a perspective schematic of a backlit display.

FIG. 12 shows a perspective schematic of a backlit display 1000 according to one exemplary aspects of the present description. Backlit display 1000 includes an LCF 1002 having transmissive regions 1004 and absorptive regions 1006 as described elsewhere. In this embodiment, absorptive region corresponding to an indicium 1008 has a height less than the heights of the surrounding absorptive regions. Backlit display 1000 includes a light source 1007 configured to transmit light through optional prismatic film 1010; then through an image plane 1012 (such as an LCD panel), and finally through LCF 1002, and on to a viewer 1014. Backlit display 1000 may further include optional cover layer 1016, which optional cover layer may provide, for instance, an anti-glare coating, an anti-reflective coating, an anti-soiling coating, or some combination thereof.

Figure 13:
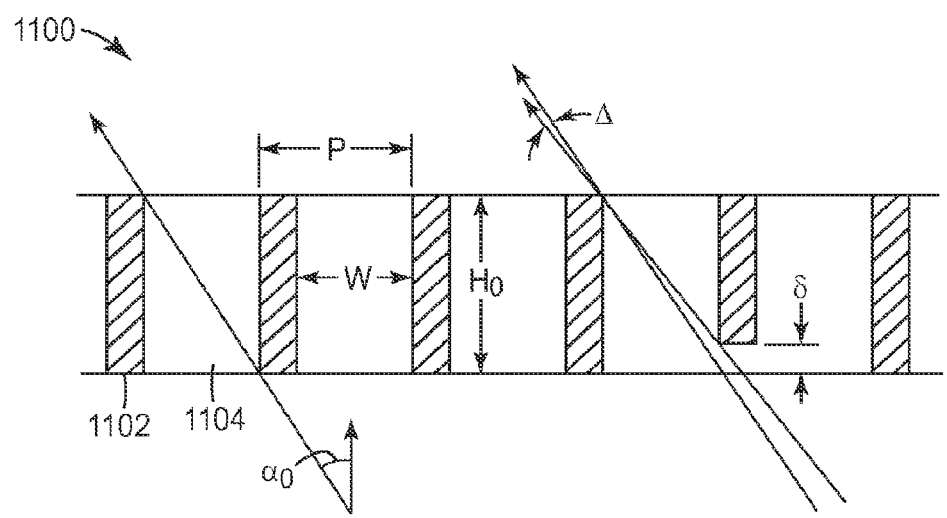
FIG. 13 is a cross sectional view of a depiction of an embodiment of a light control film of the invention.

FIG. 13 is a cross sectional view of a LCF 1100 having absorptive regions 1102 and transmissive regions 1104. The relationship between the height $H_0$ of the absorptive regions 1102, the width W of the transmissive regions 1104, the height difference between adjacent absorptive regions 1102 corresponding to indicium and one that does not ($\delta$), and viewing cutoff angle $\alpha_0$ and the effect on viewing angle for an indicium $\Delta$ is described by the equations below:

$$\tan \alpha_0 = W/H_0$$

$$\tan(\alpha_0+\Delta)=W/(H_0-\delta)$$

$$\tan \Delta = W\delta/H_0(H_0-\delta)+W^2 \approx \delta \sin^2\alpha_0/W$$

The present description should not be considered limited to the particular examples described herein, but rather should be understood to cover all aspects of the description as fairly set out in the attached claims. Various modifications, equivalent processes, as well as numerous structures to which the present description can be applicable will be readily apparent to those of skill in the art to which the present description is directed upon review of the instant specification.

EXAMPLES

Example 1

Tool Preparation

A CAD program was used to create a model of the desired indicia. This example has the height of the absorptive regions corresponding to the indicia less than the surrounding regions. Therefore the indicia was modeled as a recess in the CAD model representing the workpiece.

A hard copper plated cylindrical mandrel mounted in a diamond turning machine with a suitable cutting element was used. The mandrel was first prepared by machining the outer diameter of the cylinder to ensure a smooth surface for subsequent machining steps. Next, the tool tip used to machine the channels in the microstructured film was used to machine the indicia.

While the cylinder was rotating at 200 revolutions per minute (RPM), the tool tip and actuator machined recesses into the cylindrical mandrel at the precise locations determined circumferentially by the CAD file and at an advance per revolution of 71.1 micrometers. The advance per rev used was the same advance per revolution as the channels to be cut, however, the starting location for the indicia machining is shifted half this amount to ensure that the copper ribs remaining are centered on the tool tip center. After the indicia were machined, the tool tip's dynamic capability was turned off and standard machining of channels for the microstructured film was carried out. This step effectively removed most of the copper surface from the prior machining steps but left copper ribs with regions containing the lower height indicia. After the cylindrical mandrel was machined, it was plated with 0.5 micrometer chrome plating. The resulting pitch of the ribs was 71.1 micrometers and the height of the ribs outside of the indicia was 146 micrometers. The heights of the ribs corresponding to the indicia were 128, 132, 136, and 139 micrometers.

A tool to provide an LCF having absorptive regions corresponding to indicia having heights greater than the surrounding regions is made as described above except during the indicia machining process, the cutting tool head would be extended into the cylindrical mandrel to produce the surrounding area. While in the region of the indicia however, the cutting tool is retracted to its designed value creating a protrusion. A tool to provide an LCF having absorptive regions corresponding to indicia having variable heights is made as described above except for the variable extension and retraction of the cutting tool into the cylindrical mandrel.

Preparation of Microstructured Film

Microstructured films were made by molding and ultraviolet (UV) light curing a resin mixture containing 94% by weight PHOTOMER 6010 (an aliphatic urethane diacrylate available from Cognis, Cincinnati Ohio), 5% by weight SR-285 (tetrahydrofurfuryl acrylate available from Sartomer, Exton Pa.), and 1% by weight DAROCUR 1173 (a photoinitiator available from Ciba Specialty Chemicals, Tarrytown N.Y.) on a 0.007 inch (0.178 mm) polycarbonate (PC) film. For these structured films, a cylindrically-shaped metal roll with finely detailed channels cut into its outer surface served as the mold. The resinous mixture was first coated onto the PC substrate film, and then pressed firmly against the metal roll in order to completely fill the mold. Upon polymerization the structured film was removed from the mold. The resulting structure in the cured resin was a series of evenly spaced channels, each having a nominally trapezoidal cross-section.

Preparation of Light Control Film with Indicia

Light collimating films were made by filling the gaps between the transparent channels of the microstructured film with absorptive material-containing resin. The absorptive material-containing resin mixture contains 67% by weight PHOTOMER 6210 (an aliphatic urethane diacrylate available from Cognis), 20% by weight 9B385 (a carbon black UV curable paste available from Penn Color, Doylestown Pa.), and 10% by weight SR285. The absorptive material-containing resin also contained 1% each of IRGAUCRE 369, IRGACURE 819, and DAROCUR 1173, each of which are photoinitiators available from Ciba Specialty Chemicals, Tarrytown N.Y. Excess black-containing resin was wiped from the surfaces of the transparent channels. The carbon black filled channels were then cured using UV radiation, resulting in a light collimating film.

What is claimed is:

1. A light control film having an indicium visible at a range of viewing angles, comprising:
   a light input surface and a light output surface opposite the light input surface; and
   alternating transmissive and absorptive regions disposed between the light input surface and the light output surface, each absorptive region having a height, wherein the heights of the absorptive regions corresponding to the indicium are different than the heights of the absorptive regions that surround the absorptive regions corresponding to indicium.

2. The light control film of claim 1 wherein the heights of the absorptive regions corresponding to the indicium are less than the heights of the absorptive regions that surround the regions corresponding to the indicium.

3. The light control film of claim 2 wherein the heights of the absorptive regions corresponding to the indicium are varied.

4. The light control film of claim 2 wherein the heights of the absorptive regions corresponding to the indicium are zero height.

5. The light control film of claim 1 wherein the heights of the absorptive regions corresponding to the indicium are greater than the heights of the absorptive regions that surround the regions corresponding to the indicium.

6. The light control film of claim 5 wherein the heights of the absorptive regions corresponding to the indicium are varied.

7. The light control film of claim 1 wherein the absorptive regions have a length and the heights of the absorptive regions corresponding to the indicium vary along the length of such absorptive regions.

8. The light control film of claim 1 wherein absorptive regions have a trapezoidal shape.

9. The light control film of claim 1 wherein each transmission region has an index of refraction (N1) and each absorptive region has an index of refraction (N2), wherein ((N2)−(N1)) is not less than −0.005.

10. The light control film of claim 9 wherein ((N2)−(N1)) is between −0.005 and 0.02.

11. The light control film of claim 7 wherein the heights of the absorptive regions corresponding to the indicium vary along a portion of the length of such absorptive regions.

12. The light control film of claim 11 wherein the heights of the absorptive regions corresponding to the indicium is zero height in the portion of the length.

13. The light control film of claim 1 having at least first and second indicium.

14. The light control film of claim 13 wherein each of the absorptive regions corresponding to each of the at least first and second indicium have different heights.

* * * * *

UNITED STATES PATENT AND TRADEMARK OFFICE
CERTIFICATE OF CORRECTION

PATENT NO.        : 8,096,667 B2                          Page 1 of 1
APPLICATION NO.   : 12/465481
DATED             : January 17, 2012
INVENTOR(S)       : Gary T Boyd et al.

It is certified that error appears in the above-identified patent and that said Letters Patent is hereby corrected as shown below:

On the Title Page
Item (57) (Abstract), Line 9, Delete "that" and insert -- than --, therefor.

Column 4,
Line 52, Delete "FIG. 3)," and insert -- FIG. 2), --, therefor.

Column 5,
Line 48, Delete "$\Phi_1$" and insert -- $\Phi_I$ --, therefor.

Signed and Sealed this
Twenty-seventh Day of March, 2012

David J. Kappos
*Director of the United States Patent and Trademark Office*